US 8,838,064 B2

(12) United States Patent
Taylor et al.

(10) Patent No.: US 8,838,064 B2
(45) Date of Patent: *Sep. 16, 2014

(54) SYSTEMS AND METHODS FOR LOCALIZED WIRELESS NOTIFICATION

(71) Applicant: QUALCOMM Incorporated, San Diego, CA (US)

(72) Inventors: Kirk S. Taylor, San Diego, CA (US); Liren Chen, San Diego, CA (US); Jack B. Steenstra, San Diego, CA (US); Guilherme K. Hoefel, San Diego, CA (US); Yang Zhang, San Diego, CA (US); Zhiheng Mao, San Diego, CA (US); Santosh Gopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,419

(22) Filed: Nov. 19, 2012

(65) Prior Publication Data
US 2013/0079034 A1 Mar. 28, 2013

Related U.S. Application Data

(63) Continuation of application No. 12/556,934, filed on Sep. 10, 2009, now Pat. No. 8,340,628.

(51) Int. Cl.
*H04M 11/04* (2006.01)
*H04W 24/00* (2009.01)
*H04L 29/08* (2006.01)
*H04W 4/02* (2009.01)

(52) U.S. Cl.
CPC .............. *H04W 4/02* (2013.01); *H04L 67/18* (2013.01); *H04W 4/021* (2013.01)
USPC ................. 455/404.1; 455/404.2; 455/456.1

(58) Field of Classification Search
USPC ................. 455/404.1, 404.2, 403, 456.1–457
See application file for complete search history.

(56) References Cited

U.S. PATENT DOCUMENTS

| 8,340,628 | B2 | 12/2012 | Taylor et al. |
| 2003/0069002 | A1 | 4/2003 | Hunter et al. |

(Continued)

FOREIGN PATENT DOCUMENTS

WO WO0133892 5/2001

OTHER PUBLICATIONS

International Search Report and Written Opinion—PCT/US2010/048419, ISA/EPO—Apr. 20, 2011.

*Primary Examiner* — Ajit Patel
(74) *Attorney, Agent, or Firm* — Gerald P. Joyce, III

(57) ABSTRACT

Implementations relate to systems and methods for localized notification that provide localized information to one or more mobile devices in a wireless communication system that are located in one or more geographical regions. The wireless communication system includes a localized notification server that responds to geographically-targeted broadcast requests and localized service or information requests. The localized notification server localizes components of the wireless communication system into sets of localized components that provide wireless communication service to mobile devices in the specific geographical regions.

In response to a request to broadcast to a target geographical region, the localized notification server identifies a set of localized components associated with the target geographical region. The localized notification server then broadcasts information to mobile devices actively serviced by the set of localized components.

14 Claims, 8 Drawing Sheets

(56) References Cited

U.S. PATENT DOCUMENTS

| | | |
|---|---|---|
| 2003/0143974 A1 | 7/2003 | Navarro |
| 2004/0103158 A1 | 5/2004 | Vella et al. |
| 2004/0203562 A1 | 10/2004 | Kolsrud |
| 2005/0078644 A1 | 4/2005 | Tsai et al. |
| 2005/0237183 A1* | 10/2005 | Lamb ............ 340/539.11 |
| 2006/0058005 A1 | 3/2006 | Dolezal et al. |
| 2007/0066366 A1 | 3/2007 | Graham |
| 2007/0123220 A1 | 5/2007 | Weiser et al. |
| 2007/0293240 A1 | 12/2007 | Drennan |
| 2009/0134982 A1 | 5/2009 | Robertson et al. |
| 2009/0164665 A1* | 6/2009 | Foote et al. ............ 709/245 |
| 2009/0247111 A1 | 10/2009 | Sennett et al. |
| 2010/0009651 A1 | 1/2010 | Daly et al. |
| 2010/0240339 A1 | 9/2010 | Diamond |

\* cited by examiner

SYSTEMS AND METHODS FOR LOCALIZED WIRELESS NOTIFICATION

CLAIM OF PRIORITY UNDER 35 U.S.C. §120

The present application for patent is a continuation of patent application Ser. No. 12/556,934 entitled "Systems and Methods for Localized Wireless Notification" filed Sep. 10, 2009, pending, and assigned to the assignee hereof and hereby expressly incorporated by reference herein.

FIELD

The present teachings relate generally to methods and apparatus for providing localized wireless notification, and more particularly to platforms and techniques for localizing components of a wireless communication system into localized components based on geographical regions and providing localized information to one or more mobile devices in a specific geographical region.

RELATED ART

Advancements in wireless communication technology and mobile communication devices, such as the integration of camera and video recording technology into mobile communication devices and the incorporation of e-mail and short messaging services into cellular communication networks, have added greater flexibility, processing power, and communication capabilities to the already ubiquitous mobile communication devices. As a result, such mobile communication devices have become more popular in the consumer marketplace, and many consumers now carry their mobile communication devices, such as cell phones and personal digital assistants, on their person most of the time and rely on these devices to take pictures and shoot videos, exchange messages in their social network, make purchase decisions, conduct financial transactions, and carry out other activities.

Presently, in the event of an emergency, such as terrorist attacks, school shootings, child abductions, inclement weather, major accidents, and other threats and disasters, emergency communications and broadcasts are frequently used to alert people of the emergency. For example, the Emergency Alert System is a U.S. national warning system that broadcasts warnings and alerts over radio and television in the event of an emergency that can negatively affect the health or welfare of the public. For another example, Reverse 911 is used in hundreds of communities, businesses, and schools to allow emergency services to quickly alert, typically via land-based telephone networks, members of a community or organization of an emergency.

However, current emergency broadcast and alert systems have limited reach. For instance, most office workers do not have access to television or radio during work hours, and thus are difficult to reach using the Emergency Alert System. Similarly, many households no longer have a land-based telephone at home, and thus are difficult to reach using Reverse 911.

SUMMARY

According to the present teachings in one or more aspects, methods and apparatus for performing localized notification in one or more wireless communication systems are provided, in which localized information content is transmitted to one or more mobile devices located in a specific geographical region. The localized notification system includes a localized notification server that responds to geographically-targeted localized broadcast requests and localized service or information requests. In general implementations of the present teachings, the localized notification server can localize components of the wireless communication systems into sets of localized components that provide localized notification service to mobile devices in corresponding geographical regions, which can be predefined or dynamically defined. The localized components can include cellular towers, cellular sites, cellular sectors, base transceiver stations, base station controllers, mobile switching centers, wireless access points, mobile devices, and the like. The localized notification server can also maintain lists of mobile devices and the sets of localized components that service the mobile devices.

Consistent with implementations of the present teachings, the localized notification server can directly broadcast the information content to mobile devices in the target geographical region via a set of localized components associated with a target geographical region after receiving a request to broadcast information content to the target geographical region. Alternatively or in addition, after receiving a request to broadcast information content to a target geographical region, the localized notification server can identify mobile devices that are being serviced by a set of localized components associated with the target geographical region, and then broadcast the information content to the identified mobile devices. Also consistent with implementations of the present teachings, after receiving a localized service or information request from one of the mobile devices via one of the localized components, the localized notification server can identify the geographical region in which the requesting mobile device is located based on the localized component. The localized server can then transmit localized information based on the identified geographical region and any data provided by the requesting mobile device.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Figure 1:
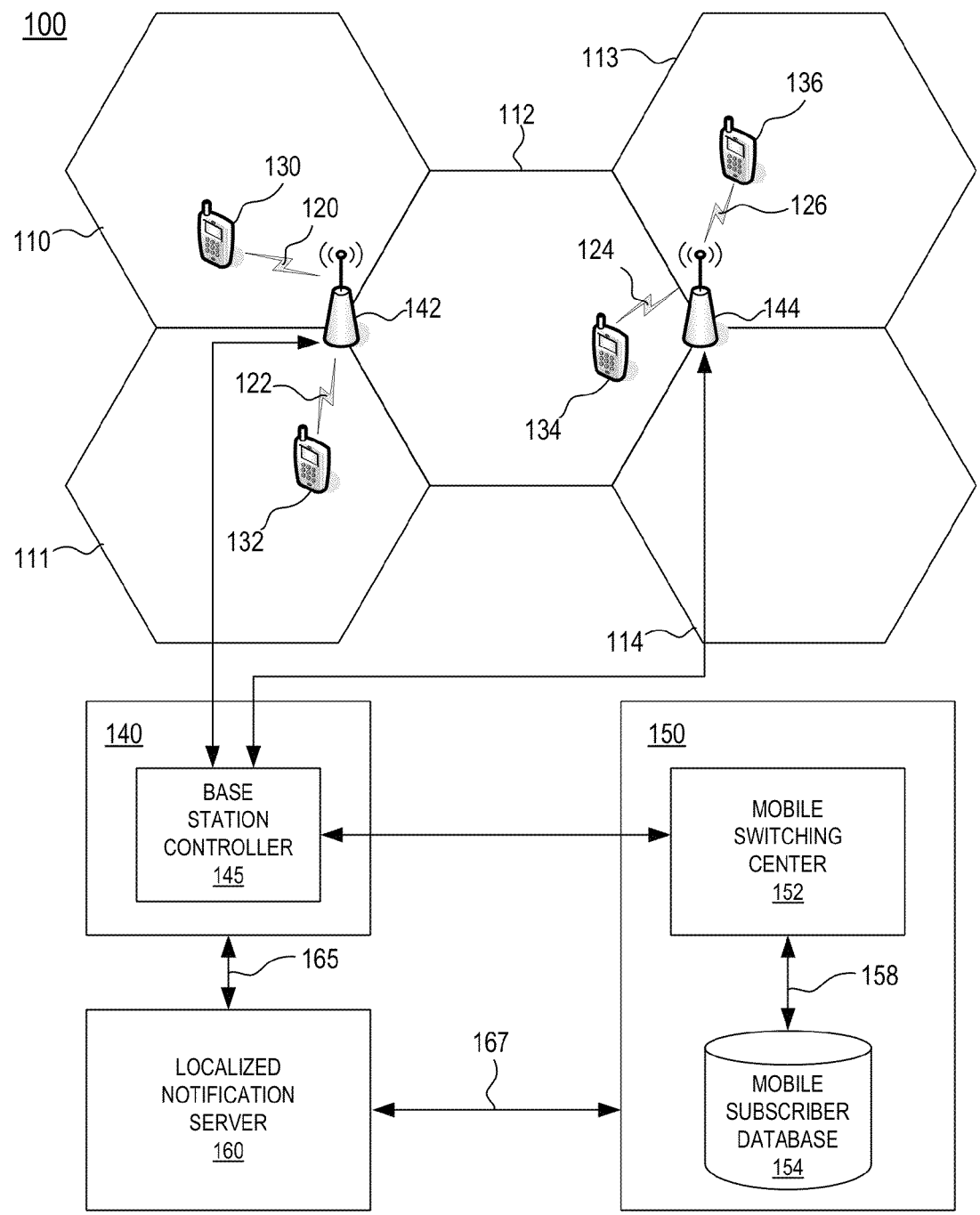
FIG. 1 illustrates a wireless communication system that includes an exemplary localized notification server, according to implementations of the present teachings.

Reference will now be made in detail to implementations of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which can be practiced. These implementations are described in sufficient detail to enable those skilled in the art to practice these implementations and it is to be understood that other implementations can be utilized and that changes can be made without departing from the scope of the present teachings. The following description is, therefore, merely exemplary.

Aspects of the present teachings relate to systems and methods for providing localized notification and information to one or more mobile devices in a wireless communication system. More particularly, in various aspects, systems and methods for localized notification can provide localized information to one or more mobile devices in a geographical region via localized components of the wireless communication system. The localized notification system includes a localized notification server, as for example generally shown in FIGS. 1 and 3 and described in greater detail infra, for responding to geographically-targeted localized broadcast requests and localized service or information requests. Prior to providing localized notification, the localized notification server, which can be integrated in or be communicatively coupled to the wireless communication system, can localize components of the wireless communication system into sets of localized components that provide wireless communication service to mobile devices in specific geographical regions. In an implementation, the localized components can include cellular towers, cellular sites, cellular sectors, base transceiver stations, base station controllers, mobile switching centers, wireless access points, mobile devices, and the like. In a further implementation, the localized components can be limited to components that directly communicate with the mobile devices, such as cellular towers, cellular sites, cellular sectors, base transceiver stations, wireless access points, and the like. The localized notification server can maintain or access lists of mobile devices in the wireless communication system and the sets of localized components that service the mobile devices in one or more specific geographical regions by, for example, providing wireless communication service to the mobile devices in the specific geographical regions.

The localized notification server can determine a set of localized components associated with the target geographical region prior to or upon receiving a localized broadcast request to broadcast information content to a target geographical region. Next, the localized notification server can either directly broadcast the information content via the set of localized components, or can ascertain a set of mobile devices that are being serviced by the set of localized components and then broadcast the information content to the set of mobile devices. In further implementations, upon receiving a localized service or information request from one of the mobile devices via one of the localized components, the localized notification server can identify the geographical region in which the requesting mobile device is located based on the localized component. Based on the identified geographical region and data, if any, provided by the requesting mobile device, the localized notification system can either generate localized information content or forward the localized request to a third-party service or information provider to acquire localized information content. The localized notification system can then transmit the localized information content in response to the localized service or information request.

FIG. 1 illustrates a cellular system 100 comprising components that provide wireless communication service to mobile devices (e.g., mobile devices 130-136). Examples of mobile devices 130-136 can include any mobile communication device, such as a cellular telephone (cell phone), a personal digital assistant (PDA), a wireless device or modem adapted to operate on a wireless access network, such as a wireless access network operating using an IEEE 802.16 standard (WiMAX) or an IEEE 802.11 standard (Wi-Fi), or an electronically coupled set of two or more of these devices. For illustration and description purposes, an implementation of the localized notification system that provides localized notification in conjunction with cellular system 100 is illustrated in FIG. 1 and described herein. However, the localized notification system is not limited to cellular communication systems. For example, without departing from the intended scope of the present teachings, the localized notification system can provide localized notification in conjunction with any existing or future-arising wireless communication systems that provide wireless communication service to known physical locations or geographical regions, such as WiMAX and Wi-Fi communication systems.

Cellular system 100 can be an analog or digital communication system and can employ one or more of several types of multiple access modulation schemes, such as Code Division Multiple Access (CDMA), Time Division Multiple Access (TDMA), or Frequency Division Modulation Access (FDMA). The components in cellular system 100 can include, for example, a base station 140 including base transceiver stations (BTS) 142-144 and a base station controller (BSC) 145, a network server 150 including a mobile switching center (MSC) 152, and the like. MSC 152 can communicate with at least one BSC 145, which is shown in communication with two BTSs 142-144, which are illustrated for simplicity as radio towers. BTSs 142-144 can service (i.e., provide cellular communication service to) mobile devices 130-136 in cells 110-114 or sectors therein (not shown) via air interfaces 120-126. As is well known in the art, coverage areas (not shown) of BTSs 142-144 can vary in size and in shape, and each of the coverage areas can be sectored into, for example, two, three, or six sectors.

BSC 145 can manage telecommunication functions associated with BTSs 142-144, such as power control, call resource allocation, and mobility management functionality including, when necessary, the orchestration of handoffs between BTSs 142-144. MSC 158 can coordinate communication channels and processes, and can provide access for mobile devices 130-136 to networks, such as a public switched telephone network (PSTN), integrated services digital network (ISDN), public land mobile network (PLMN), circuit switched public data network (CSPDN), packet switched public data network (PSPDN), general packet radio service (GPRS) network, and the like. For simplicity only, cellular system 100 is shown having one base station 140, two BTSs 142-144, one BSC 145, one network server 150, and one MSC 152. However, cellular system 100 as shown in FIG. 1 is illustrative, and variations in configuration and implementation may occur to persons skilled in the art.

In various implementations of the present teachings, network server 150 can maintain a mobile subscriber database 154, which can include one or more lists (e.g., registries and the like) of mobile devices serviced by cellular system 100. Mobile subscriber database 154 is shown as an individual component of network server 150, but a portion or all of mobile subscriber database 154 can be integrated with MSC 152. The lists of mobile devices stored in mobile subscriber database 154 can include data associated with the mobile devices and subscribers thereof, such as the mobile devices' device identifier (e.g., an international mobile equipment identity (IMEI) and the like), subscriber identifier (e.g., an international mobile subscriber identity (IMSI), a mobile subscriber integrated services digital network number (MSISDN), and the like), current city, current or last-known location area, class of service or subscription plan, etc.

Mobile subscriber database 154 can comprise a home location registry (HLR), a visitor location registry (VLR), and the like, or lists of mobile devices generated from the HLR or VLR. The HLR can be used by the operator of cellular system 100, often referred to as a service provider, to maintain data associated with subscribed mobile devices. MSC 152 can communicate directly with the HLR to, for example, determine if a mobile device in cellular system 100 is authorized to place or receive communications, i.e., whether or not the mobile device's subscription status is active or inactive. If the mobile device's subscription status is inactive, cellular system 100 can be configured to not broadcast information to the inactive mobile device or to ignore a localized service or information request from the inactive mobile device.

Cellular system 100 can track the location and status of the mobile devices 130-136 present within cellular system 100 and store the tracking information in the VLR. Upon a registration event, such as power-on or entrance into a coverage area of at least one of BTSs 142-144, a mobile device (e.g., one of mobile devices 130-136) can transmit a registration message to base station 140 indicating its active presence within the coverage area, whereupon the subscriber information associated with the mobile device stored in the HLR can be loaded or otherwise copied into the VLR of the MSC (e.g., MSC 152) servicing the now-active mobile device. The registration information can be stored in the VLR, where it can be used by MSC 152 to locate the active mobile device within cellular system 100. An active but idle mobile device can periodically transmit a message to report its location, which can cause MSC 152 to update the active mobile device's location in the VLR. Further, when the active mobile device leaves the coverage area it was previously in, its registration information can be altered in the VLR. For example, if the active mobile device moves out of the coverage area of BTS 142 and moves into the coverage area of BTS 144, the active mobile device's registration information can be changed to reflect that the active mobile device is being serviced by BTS 144 and is no longer being serviced by BTS 142. If the active mobile device moves outside the coverage area of cellular system 100, its registration information can be removed from the VLR associated with cellular system 100. Thus, MSC 152 can use the VLR as a local cache to store data associated with active mobile devices in cellular system 100, including the location and status of the active mobile devices.

In various implementations of the present teachings, cellular system 100 includes a localized notification server 160, which can localize the components in cellular system 100 into sets of one or more localized components based on geographical regions (not shown). Localized notification server 160 is depicted in FIG. 1 as an individual component of cellular system 100 communicatively coupled to base station 140 and network server 150 via communications links 165 and 167, which can include wired electrical links (e.g. a T1 or T3 line), wireless links, optical links, public or private networks, the internet, or other modes of communicative coupling. However, a portion or all of localized notification server 160 can be integrated with other elements of cellular system 100, such as network server 150, MSC 152, or the like, without departing from implementations of present teachings. In an implementation, components that can be localized include BTSs 142-144, BSC 145, base station 140, MSC 152, network server 150, and mobile devices 130-136. In a further implementation, components that can be localized can be limited to components that directly communicate with the mobile devices, such as BTSs 142-144.

A geographical region can be defined based on, for example, a ZIP code, a district (e.g., a school district, a voting district, and the like), a municipality (e.g., a town, a city, and the like), a county or parish, a state or province, a university or corporate campus or other institutional properties, a street-delimited geographical area, a polygonal geographical area, a circular geographical area, a semi-circular geographical area (e.g., a cellular sector), a geographical area serviced by a telephone area code, a wireless communication service area serviced by one or more components of a wireless communication system (e.g., cellular system 100), and the like, or a combination thereof. Localized notification server 160 can predefine a geographical region by defining the geographical region prior to receiving a localized request. Alternatively or in addition, localized notification server 160 can dynamically define a geographical region upon receiving a localized request. For example, localized notification server 160 can provide a user interface through which a target geographical region can be selected and dynamically defined. As will be described in greater detail infra, for example, with respect to FIG. 4, geographical regions can be associated with one or more components of cellular system 100 based on coverage area provided by the components, such as one or more cells (e.g., cells 110-114) in cellular system 100 or sectors within the cells.

Consistent with implementations of the present teachings, localized notification server 160 can determine a set of localized components associated with a target geographical region prior to or upon receiving a localized broadcast request to broadcast information content to the target geographical region. Next, localized notification server 160 can either directly broadcast the information content to the target geographical region via the set of localized components, or can ascertain a set of mobile devices that are being serviced by the set of localized components and then broadcast the information content to the set of mobile devices, as will be described in greater detail infra, for example, with respect to FIG. 5.

Also consistent with implementations of the present teachings, after receiving a localized service or information request from one of the mobile devices via one of the localized components, localized notification server 160 can identify the geographical region in which the requesting mobile device is located based on the localized component. Based on the identified geographical region and data, if any, provided by the requesting mobile device, localized notification server 160 can either generate localized information content or forward the localized request to a third-party service or information provider (not shown) to acquire localized information content. Data provided by the requesting mobile device can include a subscriber profile or device information stored in a memory of the requesting mobile device, image or sensor data generated by the requesting mobile device, and the like. Localized notification server 160 can then transmit the localized information content in response to the localized service or information request, as will be described in greater detail infra, for example, with respect to FIG. 6.

Broadcasting the information content can include transmitting the information content to a targeted mobile device or a set of targeted mobile devices in cellular system 100, which can be presented on a visual display or on audio speakers of the targeted mobile devices. Information content can comprise visual, auditory, or sensory content, or a descriptor of a location to make such content accessible. For example, the information content can be in the form of an image, text, streaming or non-streaming video, streaming or non-streaming audio, a Universal Resource Locator (URL), a Wireless Application Protocol (WAP) page, a Hyper Text Markup Language (HTML) page, an Extensible Markup Language (XML) document, an executable program, a filename, an Internet Protocol (IP) address, a telephone call, a pointer, or other content. The information content can be communicated to the mobile devices via a communication protocol such as, for example, short messaging service (SMS), a standard form of telephony, electronic mail (e-mail), multimedia messaging service (MMS), enhanced messaging service (EMS), WAP push, application push (e.g., a push registry), or standard internet protocols such as Transmission Control Protocol (TCP), IP, User Datagram Protocol (UDP), hypertext transfer protocol (HTTP), and File Transfer Protocol (FTP).

Localized notification server 160 can directly broadcast information content to a target geographical region via at least one communication channel selected based on the information content's format. For information content in text or SMS format, localized notification server 160 can instruct one or more localized components associated with the target geographical region to use a cell broadcast channel to cell broadcast the information content. For information content in binary format, such as videos, localized notification server 160 can instruct one or more localized components associated with the target geographical region to IP broadcast or use an IP multicast group to directly broadcast the information content to mobile devices in the target geographical region. For information content in voice or audio format, localized notification server 160 can instruct one or more localized components associated with the target geographical region to use a voice broadcast channel to directly broadcast the information content to mobile devices in the target geographical region. In an implementation, the voice broadcast channel is a one-way communication channel through which information content can be pushed to mobile devices, and thus mobile devices can only receive information content via the voice broadcast channel. For example, when mobile devices receives a voice broadcast via the voice broadcast channel, users of those mobile devices can conference in and listen to the voice broadcast but cannot participate in a two-way communication via the voice broadcast channel.

Figure 2:
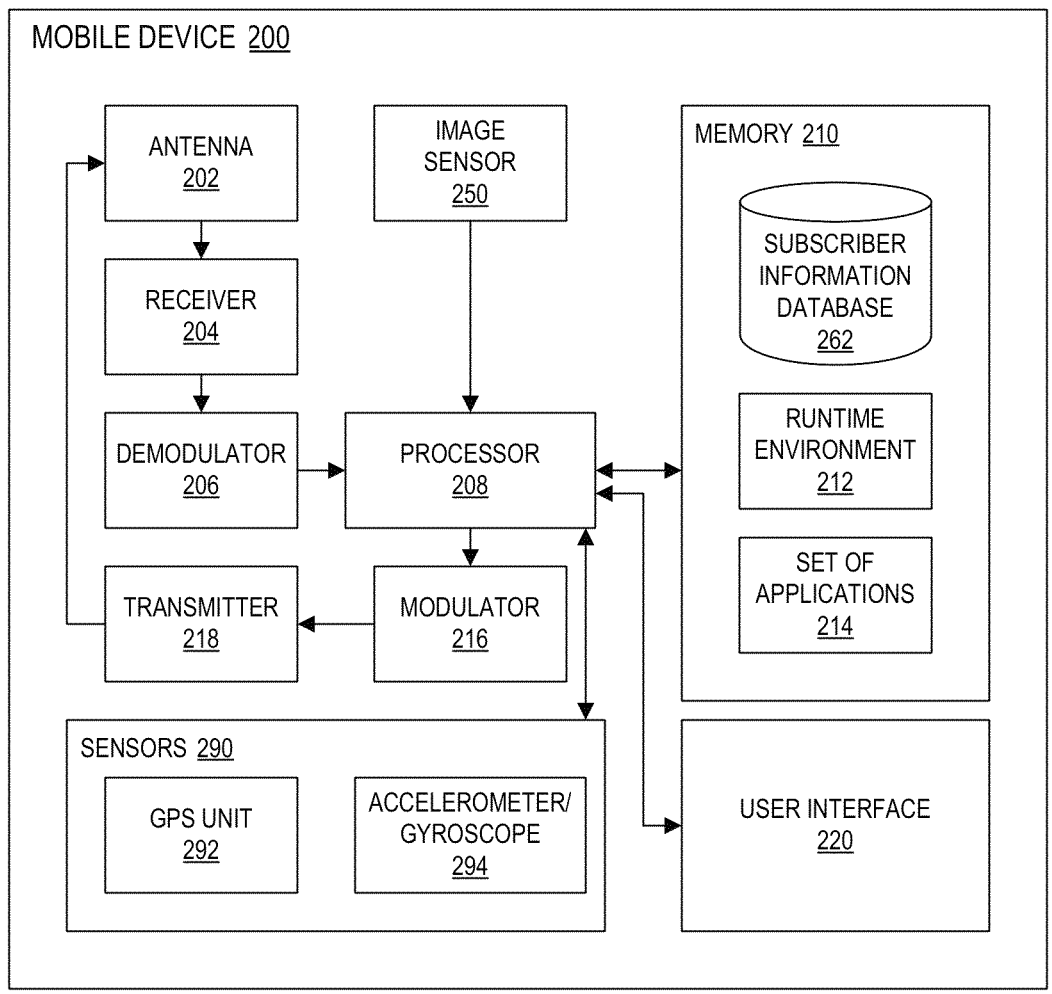
FIG. 2 illustrates an exemplary configuration of a mobile device, consistent with implementations of the present teachings.

Reference will now be made to FIG. 2 to illustrate an exemplary configuration of a mobile device 200 (e.g., mobile devices 130-136 as shown in FIG. 1), consistent with implementations of the present teachings. Mobile device 200 can include at least one antenna 202 (e.g., a transmission receiver or group of such receivers comprising an input interface) that receives a signal (e.g., pertaining to a mobile call initiation or other handshake, a handshake response, a mobile application data transfer, a data event, data event response, handshake termination, and so on) and a receiver 204, which performs actions (e.g., filters, amplifies, down-converts, and the like) on the received signal. Antenna 202 can, for example, transmit or receive a response to a handshake request, data event request, and the like. Antenna 202 and receiver 204 can also be coupled with a demodulator 206 that can demodulate received signals and provide them to a processor 208 for processing.

Processor 208 can analyze information received by antenna 202 or a user interface 220 (e.g., a keypad, a microphone, etc.) of mobile device 200, and generate information for transmission by a transmitter 218 via a modulator 216 or for presentation via user interface 220 (e.g., a display screen, a speaker, etc.). Additionally, processor 208 can control and/or reference one or more resources or elements of mobile device 200, including, for example, demodulator 206, memory 210, modulator 216, transmitter 218, user interface 220, an image sensor 250, and sensors 290. Processor 208 can also execute a runtime environment 212, such as BREW™ from Qualcomm Inc., Java ME™ from Sun Microsystems, Symbian™ OS from Symbian Ltd., Flash Lite™ from Adobe Systems, Windows Mobile™ from Microsoft Corporation, iPhone™ OS from Apple Inc., Android™ from Open Handset Alliance, or the like, as well as a set of applications 214 or other software, modules, applications, logic, code, or the like.

Mobile device 200 can include memory 210, operatively coupled to processor 208, to store computer-readable data (e.g., a subscriber information database 262 and the like) and computer-executable software instructions (e.g., runtime environment 212, set of applications 214, and the like). The instructions can be executed to configure processor 208 to control and/or perform, for example, the functions of user interface 220, image sensor 250, sensors 290, and other modules of mobile device 200. The instructions can also be executed to configure processor 208 to store and/or retrieve data in subscriber information database 262. Subscriber information database 262 can store and provide basic information associated with mobile device 200 and its subscriber, such as a device identifier, a subscriber identifier, an MSISDN, or the like. In an implementation, subscriber information database 262 can also store and provide additional information associated with the subscriber, such as the subscriber's medical profile, dietary restrictions, preference for receiving information content, and the like. Memory 210 can comprise one or more of a solid state memory (e.g., read-only memory, random access memory, flash memory, and the like), a magnetic hard drive, an optically-readable medium such as a compact disc (CD) or digital video disc (DVD), and the like.

Mobile device 200 can include image sensor 250, which can be any electronic device capable of generating image data and can be built into mobile device 200. For example, image sensor 250 can comprise either a charge coupled device (CCD) sensor or a complementary metal-oxide-semiconductor (CMOS) sensor, and a set of optical lenses to convey a light pattern onto the sensor and thereby generate the image data. In operation, a user can point image sensor 250 in a general direction of a target, and image sensor 250 can generate image data after capturing an area covering the target. Mobile device 200 can also include the capability to detect the location, position, orientation, movement, and/or other contextual data associated with mobile device 200. The detection and identification of the location or position of mobile device 200, for example, can be supplemented using various positioning services, such as the Global Positioning System (GPS), Assisted GPS (A-GPS), base station triangulation or trilateration, the European Galileo position system, or other positioning or location services or techniques. The detection and identification of the orientation or movement of mobile device 200, for example, can be performed using various sensors, such as built-in sensors 290, including, for example, a GPS unit, an accelerometer, a gyroscope, and/or other orientation and movement detection sensors or techniques. Mobile device 200 can also include other types of sensors, such as a temperature sensor, that can provide other types of contextual data.

Figure 3:
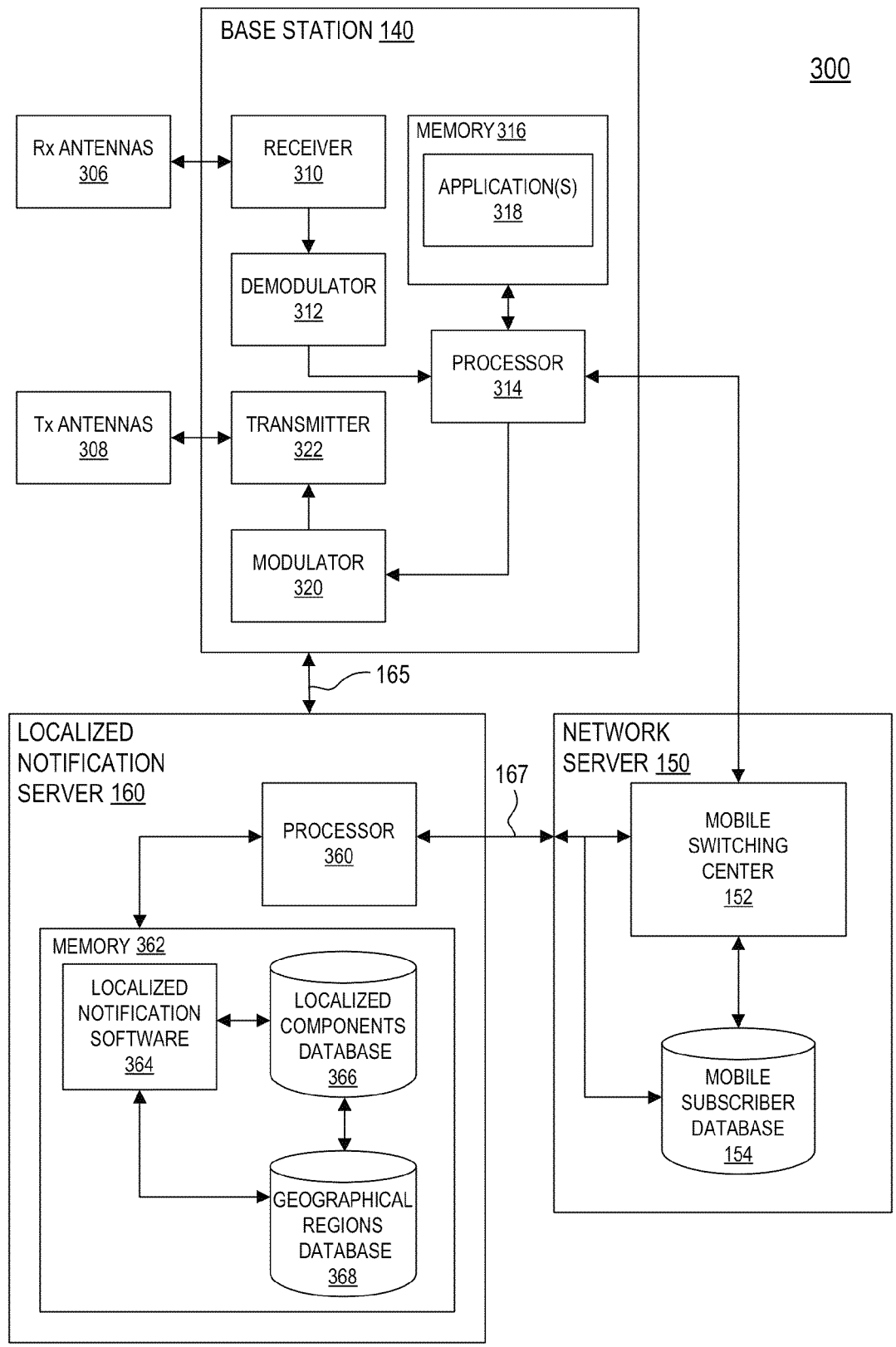
FIG. 3 illustrates an exemplary configuration of a back-end of a wireless communication system that includes a localized notification server for enabling localized notification, according to implementations of the present teachings.

Reference will now be made to FIG. 3 to illustrate an exemplary configuration of a back-end 300 of cellular system 100, including base station 140, network server 150, and localized notification server 160, which can facilitate and/or participate in providing localized notification, consistent with implementations of the present teachings. Back-end 300 can include base station 140 with a receiver 310 that receives one or more signals from mobile devices (e.g., mobile devices 130-136 as shown in FIG. 1) through receive antennas 306 and via air interfaces (e.g., air interfaces 120-126), and a transmitter 322 that transmits one or more signals modulated by modulator 320 to the mobile devices through transmit antennas 308 and via the air interfaces. Receiver 310 can receive information from receive antennas 306 and can further include a signal recipient (not shown) that receives feedback data related to an un-received or indecipherable data packet. Additionally, receiver 310 is operatively associated with a demodulator 312 that demodulates received information. A processor 314 can analyze demodulated symbols and information provided by demodulator 312.

Processor 314 further couples to a memory 316 that can store one or more applications 318 that facilitate and/or participate in remote communication between the mobile devices, network server 150, and/or localized notification server 160. For instance, applications 318 can include a primary application configured to initiate a handshake and send data event requests (e.g., related to diagnostic information, data analysis, and so on) to a recipient application operating on the mobile devices. Alternatively, applications 318 can include a secondary application that can receive a handshake request and authenticate an initiating application on the mobile devices. Applications 318 can further include rules for generating and/or verifying identifiers that identify applications 318 to a corresponding application on the mobile devices or vice versa, or an increment of such identifiers identifying a particular round-trip communication. Further, the rules can specify policies for re-transmitting un-acknowledged transmissions, re-initiating handshake requests and/or responses, and terminating a handshake, or the like. Consequently, applications 318 can engage in mobile communication with one or more applications (e.g., set of applications 214 as shown in FIG. 2) resident upon the mobile devices, and/or any other suitable activity related to performing the various actions and functions set forth herein.

Back-end 300 can include localized notification server 160 that operates in conjunction with network server 150 as described supra, for example, with respect to FIG. 1, and base station 140 to enable and provide localized notification. Localized notification server 160 can include a processor 360 and a memory 362, which includes one or more computer-readable medium that is operatively coupled to processor 360 and can store instructions to be executed and data to be transmitted, received, processed, and the like. Processor 360 can be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, processor 360 can be any conventional processor, controller, microcontroller, or state machine. Processor 360 can also be implemented as a combination of computing devices, e.g., a combination of a DSP and a microprocessor, a plurality of microprocessors, one or more microprocessors in conjunction with a DSP core, or any other such configuration. For example, processor 360 can include a localization processor, a localized response processor, and the like. Memory 362 can comprise one or more of a solid state memory, a magnetic hard drive, an optically-readable medium such as a CD or DVD, and the like, and can store localized notification software 364, a localized components database 366, and a geographical regions database 368.

Instructions stored in localized notification software 364 can be executed to configure processor 360 to enable or perform localized notification to the mobile devices in response to geographically-targeted localized broadcast requests and localized service or information requests. Instructions stored in localized notification software 364 can be executed to configure processor 360 to add, update, or delete tuples in localized components database 366 and geographical regions database 368 by, for example, extracting data from or cross-referencing relevant databases in network server 150 or other components of cellular system 100, extracting data from or cross-referencing relevant databases in other wireless communication systems (e.g., WiMAX and Wi-Fi communication systems), and providing a user interface for a user to view or to manually add, update, or delete tuples.

In an implementation, geographical regions database 368 can store and provide defined geographical regions within coverage areas provided by cellular system 100. Geographical regions database 368 can localize components of cellular system 100 by associating the defined geographical regions with one or more components of cellular system 100 based on coverage areas provided by the components. Geographical regions database 368 can also localize components of other wireless communication systems that provide wireless communication service to the defined geographical region, by associating the defined geographical regions with one or more components (e.g., wireless access points) of the wireless communication systems based on coverage areas provided by the components. Further, geographical regions database 368 can associate, to one or more of the defined geographical regions, the identification and/or level of authorization of one or more users (or their mobile devices) that are authorized to broadcast information content to those defined geographical regions.

Localized components database 366 can store data pertaining to the localized components in cellular system 100 and their associated defined geographical regions. Localized components database 366 can also store data pertaining to the localized components in other wireless communication systems and their associated defined geographical regions. The localized components stored in localized components database 366 can be further indexed based on their associated defined geographical regions. Thus, upon receiving a request to broadcast information content to a target geographical region, localized notification server 160 can efficiently determine which of the localized components provides coverage area in the target geographical region. Further, upon receiving a request for localized service or information from one of the mobile devices via one of the localized components, localized notification server 160 can identify at least one defined geographical region from which the mobile device is making the request.

In one implementation, base station 140, network server 150, localized notification server 160, and components therein can reside at different physical locations and be communicatively coupled via communication links. For example, as shown in FIG. 3, network server 150 can be physically resident at a location managed by a cellular telephone company that also manages base station 140. Meanwhile, localized notification server 160 can physically reside at a different location, such as, for example, an emergency broadcast center (e.g., an Emergency Alert System source station and the like), an emergency services provider (e.g., a police station, a fire station, a hospital, and the like), a service directory (e.g., mobile Yellow Pages, Zagat Survey, and the like), a content provider, a marketing provider, a media provider, or other provider or source of information content to be delivered to mobile devices in cellular system 100. In another implementation, network server 150, localized notification server 160, and components therein can reside at the same physical location. For example, network server 150 and localized notification server 160 can both be physically resident at a location managed by a cellular telephone company that also manages base station 140. Thusly arranged, localized notification server 160 can provide an interface (e.g., a web page or application, a wireless interface, and the like) so that an emergency broadcast center, an emergency services provider, a service directory, a content provider, a marketing provider, a media provider, a mobile device, or other provider or source of information content can access the functionality of localized notification server 160.

According to implementations, localized notification software 364 can include a search engine that locates and provides relevant information content in response to localized service or information requests from the mobile devices. The search engine can perform a crawl of information content databases (not shown) and/or other computer-readable data storage medium (not shown) coupled to localized notification server 160 to locate and index information content stored therein prior to or while providing localized notification. Thus, the search engine can locate relevant information content by accessing the index in response to the localized requests. Accordingly, localized notification server 160 can determine what information content to deliver to the mobile devices and/or how to deliver the information content, such as the form of the information content and the communication channel or protocol, etc., based on the localized service or information requests and any data provided by the requesting mobile devices.

Figure 4:
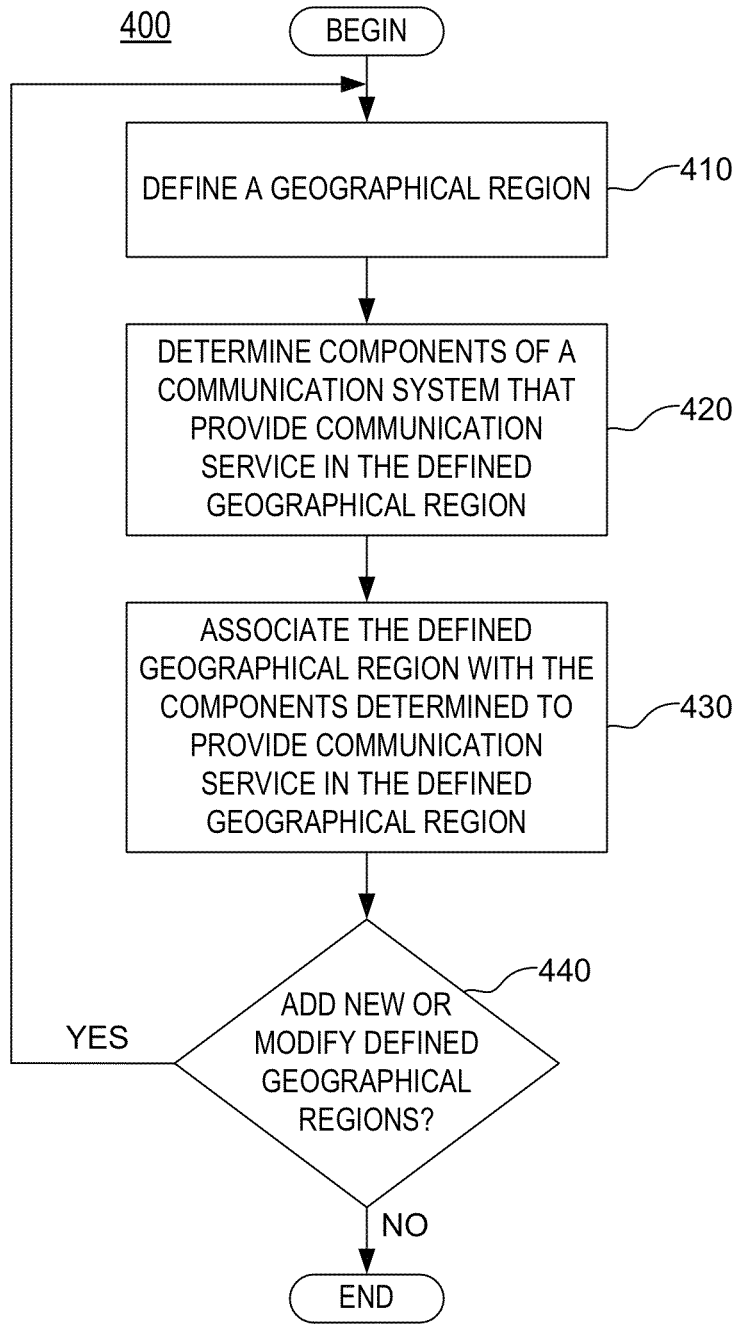
FIG. 4 illustrates a flowchart of processing performed by an exemplary localized notification server to enable localized notification, according to implementations of the present teachings.

FIG. 4 illustrates a flowchart of processing 400 performed by a localized notification server (e.g., localized notification server 160 as shown in FIGS. 1 and 3) to enable and facilitate localized notification in a wireless communication system (e.g., cellular system 100), according to implementations of the present teachings. The localized notification server can perform processing 400 to predefine a geographical region prior to responding to geographically-targeted localized broadcast requests or localized service or information requests. Alternatively or in addition, the localized notification server can perform processing 400 to dynamically define a geographical region while responding to localized requests. In 410, the localized notification server can define geographical regions in coverage areas provided by the wireless communication system and can store the defined geographical regions in a geographical regions database (e.g., geographical regions database 368). In an implementation, the localized notification server can define geographical regions by extracting data from relevant databases in a network server (e.g., network server 150) or other components of the wireless communication system. In a further implementation, the localized notification server can provide a user interface for a user to define new geographical regions or modify defined geographical regions, and can cross-reference relevant databases in the network server or other components of the wireless communication system to ensure the validity of the user-defined geographical regions. As described supra, a geographical region can be defined based on, for example, a ZIP code, a district, a municipality, a county or parish, a state or province, a university or corporate campus or other institutional properties, a street-delimited geographical area, a polygonal geographical area, a circular geographical area, a semi-circular geographical area, a geographical area serviced by a telephone area code, a wireless communication service area serviced by one or more components of a wireless communication system, and the like, or a combination thereof.

In 420, the localized notification server can determine one or more components of the wireless communication system that provide wireless communication service in one or more of the defined geographical regions based on, for example, coverage area provided by the components, such as one or more cells (e.g., cells 110-114) in cellular system 100 or sectors within the cells. Alternatively or in addition, localized notification server 160 can determine one or more components of a non-cellular wireless communication system that provide wireless communication service in the defined geographical regions, such as wireless access points of WiMAX and Wi-Fi communication systems. The localized notification server can extract data from or cross-reference relevant databases in the network server or other components of the wireless communication system to make that determination.

Next, in 430, the localized notification server can localize components of the wireless communication system by associating the defined geographical regions with the components that have been determined to provide wireless communication service in the defined geographical regions. The localized notification server can store the localized components and their associated geographical regions in a localized components database (e.g., localized components database 366). The localized components stored in the localized components database can be indexed based on their associated geographical regions, which enables the localized notification server to efficiently determine which of the localized components provide coverage area in any of the defined geographical regions stored in the geographical regions database. As described supra, in an implementation, the localized components can include cellular towers, cellular sites, cellular sectors, BTSs, BSCs, MSCs, wireless access points, mobile devices, and the like. In another implementation, the localized components can be limited to components that directly communicate with the mobile devices, such as cellular towers, cellular sites, cellular sectors, BTSs, wireless access points, and the like.

In 440, the localized notification server can determine whether or not to add new or modify defined geographical regions. If the determination in 440 is YES, then processing 400 can return to 410 so the localized notification server can add new or modify defined geographical regions in coverage areas provided by the wireless communication system. If the determination in 440 is NO, then processing 400 can terminate or remain in 440 until the localized notification server decides to add new or modify defined geographical regions.

Figure 5:
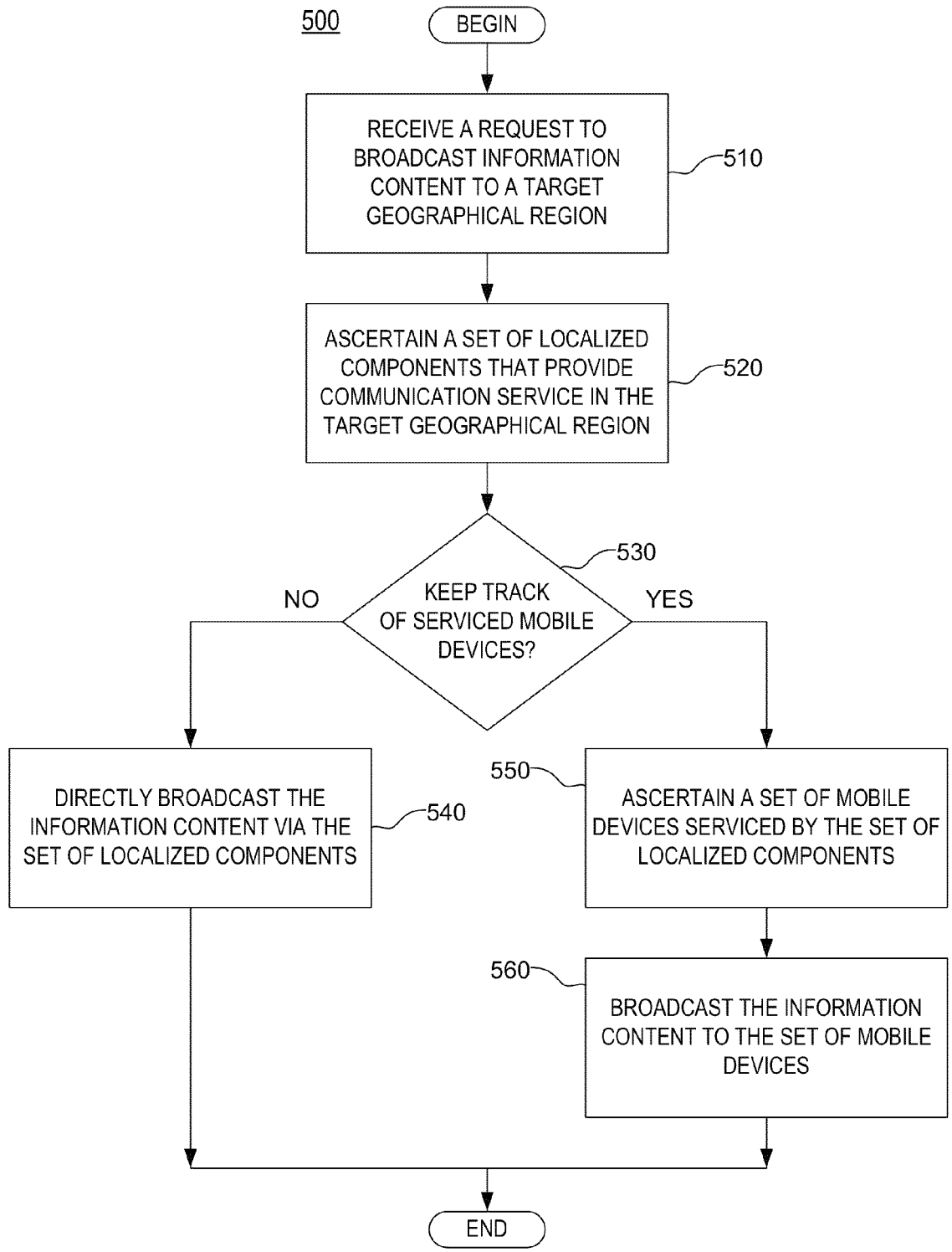
FIG. 5 illustrates a flowchart of processing performed by an exemplary localized notification server to provide localized notification in response to a geographically-targeted localized broadcast request, according to implementations of the present teachings.

FIG. 5 illustrates a flowchart of processing 500 performed by the localized notification server to provide localized notification in response to a localized broadcast request, according to implementations of the present teachings. Consistent with implementations of the present teachings, the localized notification server can initiate processing 500 upon receiving a request, in 510, to broadcast information content. The localized broadcast request can include, for example, a target geographical region, information content to be broadcasted, an identification of the requestor, a preferred and/or a secondary communication channel or protocol, a number of broadcasts, a time schedule or interval for the repeated broadcasts, and the like. The localized notification server can define the target geographical region based on one or more defined geographical regions stored in the geographical regions database. Alternatively or in addition, the localized notification server can dynamically define the target geographical region based on information provided in the localized broadcast request. For example, the localized notification server can provide a user interface through which the requestor can select a target geographical region while generating the localized broadcast request.

In an implementation, the localized notification server can provide a user interface that allows authorized users to make a geographically-targeted localized broadcast request. In a further implementation, the localized notification server can provide localized notification to a target geographical region in response to receiving a mobile device-initiated localized broadcast request from a user or a mobile device authorized to broadcast to the target geographical region. Prior to processing the localized broadcast request, the localized notification server can authenticate the requestor by verifying that the requesting user or mobile device is authorized or has a sufficient level of authorization to broadcast the information content to the target geographical region. The localized notification server can authenticate the requesting user or mobile device based on, for example, an identification (e.g., a name or unique identification of the user, a unique identification of the mobile device, or the like) and/or at least one security token (e.g., a password, an electronic signature, a biometric input, or the like) provided by the requesting user or mobile device.

The localized broadcast request can also include filter attributes, such as a priority level, a category or type of the broadcast, a display time, time to live, and the like. For instance, a localized broadcast request intended to alert students at a university of a reported shooting on the university's campus can designate the university campus as the target geographic region, include the time and location of the shooting in the information content, identify the campus police department as the requestor that made the localized broadcast request, specify that the information content be sent as SMS messages, set the number of broadcasts to three to increase the probability that the students' mobile devices receive the broadcasted information content, and indicate a very high level of priority and a category of "life-threatening emergency." For another instance, a localized broadcast request intended to alert drivers near or approaching the scene of a major automobile accident can designate a street-delimited area near the scene of the accident as the target geographic region, include the location of accident and a suggested detour around the accident in the information content, identify the state highway police as the requestor that made the localized broadcast request, specify that the information content be sent as a voice message, set the number of broadcasts to one to minimize distractions to the drivers, and indicate a medium level of priority and a category of "traffic alert." The above listing of exemplary localized broadcast requests are for illustration purposes only and are not meant to limit the present teachings in any way.

In 520, the localized notification server can ascertain a set of one or more localized components in the wireless communication system that provide localized notification service in the target geographical region. The localized notification server can ascertain the set of localized components by accessing the localized components database to determine which of the localized components provide localized notification service in the target geographical region. In an implementation, the localized notification server can determine the communication capability of the set of localized components, such as, for example, the localized components' capability to broadcast information content simultaneously to an expected or actual number of actively serviced mobile devices using the preferred and/or secondary communication channels or protocols specified in the localized broadcast request. If the set of localized components are determined to lack the capability to handle the localized broadcast request using the preferred and/or secondary communication channels or protocols, the localized notification server can change the communication channel or protocol based on the localized components' communication capability.

Next, in 530, the localized notification server can determine whether or not to keep track of mobile devices actively serviced by the set of localized components at or around broadcast time based on the localized broadcast request or other factors, such as the capability and capacity of the wireless communication system and components therein. The localized notification server can keep track of actively serviced mobile devices by, for example, generating and storing a list of the actively serviced mobile devices at or around the time the set of localized components broadcast the information content.

The localized notification server can opt to keep track of the actively serviced mobile devices if the localized broadcast request requests acknowledgement of receipt of the broadcast from the actively serviced mobile devices. If the localized notification server does not receive acknowledgement of receipt from one or more of the actively serviced but unresponsive mobile devices for a threshold period of time after a broadcast, the localized notification server can repeat the broadcast to the one or more unresponsive serviced mobile devices as described infra with respect to 560. The localized notification server can receive acknowledgements via a communication protocol or channel as specified in the localized broadcast request or other communication protocols or channels known to one skilled in the art. Different levels or types of acknowledgement can differ in terms of user involvement required to acknowledge receipt of the broadcast. For example, a user-level acknowledgement can request that the mobile devices' users actively acknowledge receipt of the broadcasted information content, while a device-level acknowledgement can request that the mobile devices acknowledge receipt of the broadcast without requiring active involvement from the users.

If the localized notification server opts to broadcast to the target geographical region without keeping track of the actively serviced mobile devices, processing 500 can then proceed to 540. According to implementations of the present teachings, in 540, the localized notification server can directly broadcast the information content via the set of localized components associated with the target geographical region. For example, if the localized broadcast request specifies SMS as the preferred communication protocol, localized notification server 160 can instruct the set of localized components associated with the target geographical region to cell broadcast the information content via at least one cell broadcast channel. For another example, if the localized broadcast request specifies that the information content is in the form of a voice message, localized notification server can instruct the set of localized components to broadcast the information content via at least one voice broadcast channel.

Finally, the localized notification server can determine whether or not to repeat the broadcast prior to the termination of processing 500. If the localized notification server opts to repeat the broadcast, the localized notification server can instruct the set of localized components to broadcast the information content a number of times at scheduled times or time intervals in accordance with the localized broadcast request. According to implementations of the present teachings, the localized notification server can instruct the set of localized components to repeat the broadcast using the same communication channel or protocol, or the localized notification server can dynamically adjust the communication channel or protocol by instructing the set of localized components to repeat the broadcast using a follow-up communication channel or protocol different from previous broadcast or broadcasts. The localized notification server can dynamically adjust the follow-up communication channel or protocol for repeat broadcasts based on the localized broadcast request, the communication capability or capacity of the set of localized components, and/or an attribute (e.g., geographical location, signal strength, etc.) of the actively serviced mobile devices.

Alternatively, if in 530 the localized notification server opts to keep track of the actively serviced mobile devices, processing 500 can then proceed to 550. For example, the localized notification server can opt to keep track of actively serviced mobile devices because the localized broadcast request requests acknowledgement of receipt from the mobile devices. According to implementations of the present teachings, in 550, the localized notification server can ascertain a set of localized mobile devices actively serviced by the set of localized components associated with the target geographical region. In an implementation, the localized notification server can ascertain the set of localized mobile devices by communicating with the network server to access a mobile subscriber database (e.g., mobile subscriber database 154) to determine mobile devices that are being actively serviced by the set of localized components.

Next, in 560, the localized notification server can broadcast the information content to the set of localized mobile devices that are actively serviced at that time by the set of localized components. According to implementations of the present teachings, if the localized notification server is to broadcast to all actively serviced mobile devices in the target geographical region, then the localized notification server can instruct the set of localized components to directly broadcast the information content via, for example, one or more cell broadcasts, one or more voice broadcast channels, one or more IP broadcasts or multicast groups, or the like. However, if the localized notification server is to broadcast only to a subset of the actively serviced mobile devices in the target geographical region, then the localized notification server can instruct the set of localized components to transmit the information content only to the subset of the actively serviced mobile devices.

Finally, the localized notification server can determine whether or not to repeat the broadcast prior to the termination of processing 500. If the localized notification server opts to repeat the broadcast, the set of localized components associated with the target geographical region can broadcast the information content a number of times at scheduled times or time intervals in accordance with the localized broadcast request. The localized notification server can instruct the set of localized components to repeat the broadcast using the same communication channel or protocol, or the localized notification server can dynamically adjust the communication channel or protocol based on the localized broadcast request, the communication capability or capacity of the set of localized components, an attribute (e.g., geographical location, signal strength, etc.) of the actively serviced mobile devices, and/or the number of acknowledgements received in response to a previous broadcast. The localized notification server can convert or reformat the information content as appropriate for the communication channel or protocol. For example, after the set of localized components cell broadcast an SMS message to all actively serviced mobile devices, the localized notification server can convert the SMS message into a voice message and instruct the set of localized components to repeat the broadcast by broadcasting the voice message to the actively serviced mobile devices that have failed to acknowledge to the SMS message within a threshold period of time.

According to an implementation, subsequent to broadcasting to a first set of localized mobile devices but prior to repeating the broadcast, the localized notification server can ascertain an updated set of localized mobile devices that are actively serviced at that time by the set of localized components. After ascertaining the updated set of localized mobile devices, the localized notification server can repeat the broadcast to the updated set, instead of the first set, of localized mobile devices; alternatively, the localized notification server can repeat the broadcast only to mobile devices that have newly entered the coverage area provided by the set of localized components since the previous broadcast or broadcasts by, for example, repeating the broadcast to localized mobile devices that are in the updated set but are not in the first set of localized mobile devices.

Figure 6:
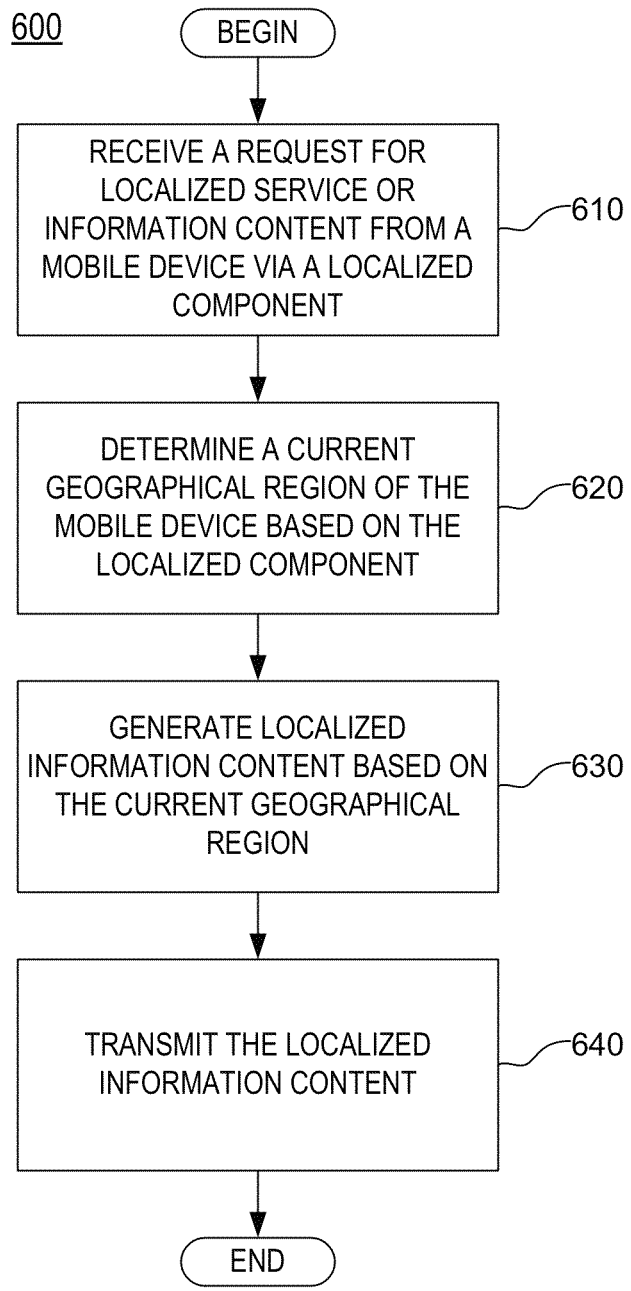
FIG. 6 illustrates a flowchart of processing performed by an exemplary localized notification server to provide localized notification in response to a localized service or information request, according to implementations of the present teachings.

FIG. 6 illustrates a flowchart of processing 600 performed by the localized notification server to provide localized notification in response to a localized service or information request, according to implementations of the present teachings. The localized notification server can perform processing 600 upon receiving a request, in 610, for localized service or information from a mobile device via one of the localized components in the wireless communication system. The localized service or information request can include, for example, a type of request (e.g., service, information, and the like), a type of requested service or information, information associated with the mobile device, information associated with the subscriber, image and other data contextual to the request, and the like.

For instance, a subscriber traveling out-of-state on a business trip can use her mobile device to request information on local vegan restaurants. The localized information request can include, for example, the subscriber's dietary restrictions, which can be taken into account by localized notification server 160 when making a recommendation of local vegan restaurants in response to the request. For another instance, the subscriber can use her mobile device to request car towing service when she gets into a car accident on the business trip. The localized towing service request can include, for example, a picture of the scene of the accident taken using the mobile device, which can be forwarded to local car towing companies so the companies can assess the severity of the accident and provide price quotes accordingly. The subscriber can also use her mobile device to request medical services for injuries sustained during the accident. The localized medical service request can include, for example, the subscriber's medical profile and insurance information stored in the mobile device, which can be forwarded to local medical service providers so the providers can decide whether or not to set up an appointment with the subscriber. The above listing of exemplary requests for localized service or information are for illustration purposes only and are not meant to limit the present teachings in any way.

In an implementation, the localized notification server can determine the subscription status of the requesting mobile device by, for example, accessing the mobile subscriber database. If the requesting mobile device's subscription status is inactive, the wireless communication system can be configured to ignore the request and terminate processing 600 with respect to the inactive mobile device.

In 620, the localized notification server can identify at least one defined geographical region in which the requesting mobile device is located based on the localized component through which the request is communicated. The localized notification server can determine that the requesting mobile device is in at least one particular defined geographical region by accessing data associated with the localized component stored in the localized components database.

Next, in 630, the localized notification server can generate localized information content in response to the localized service or information request. In an implementation, the localized notification server can generate localized information content based on the localized request, the identified geographical region, and data, if any, provided by the requesting mobile device. For example, the localized notification server can utilize a search engine to locate and provide relevant localized information content. In another implementation, the localized notification server can forward the localized request to a third-party service or information provider (not shown) to acquire localized information content. For example, the localized notification server can forward the aforementioned car towing service request to car towing companies located within the identified geographical region. In response to the forwarded request, the car towing companies can provide localized information content such as, for example, price quotes and estimated wait time, to the localized notification server. Finally, in 640, the localized notification server can transmit the localized information content to the requesting mobile device in response to the localized service or information request. After the localized notification server transmits the localized information content, processing 600 can be terminated.

Figure 7:
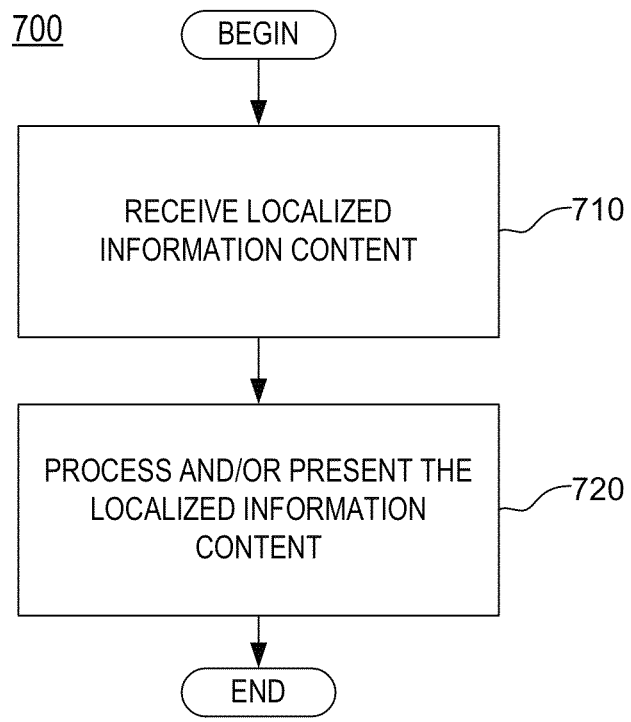
FIG. 7 illustrates a flowchart of processing performed by a mobile device to provide localized notification in response to a localized broadcast request, according to implementations of the present teachings.

FIG. 7 illustrates a flowchart of processing 700 performed by a mobile device (e.g., one of mobile devices 130-136 as shown in FIG. 1 or mobile device 200 as shown in FIG. 2) to provide localized information content in response to a geographically-targeted broadcast, according to implementations of the present teachings. In 710, the mobile device can initiate processing 700 after receiving localized information content from the wireless communication system. The mobile device can receive the localized information content via the localized component currently servicing the mobile device, which can be indicated by the mobile device's registration information. Next, in 720, the mobile device can process and/or present the localized information content to a user of the mobile device prior to the termination of processing 700.

Consistent with implementations of the present teachings, the localized information content can include filter attributes as described supra, such as a priority level, a category or type of the localized information content, a display time, time to live, and the like. If the mobile device is capable of processing the filter attributes, then the mobile device can present the localized information content to the user only if the localized information content's filter attributes match or satisfy the user's filter preference stored in the mobile device. For example, if the user's filter preference indicates that the user has opted to receive traffic alerts, then the mobile device can present localized information content that falls under the category of traffic alerts. For another example, if the user's filter preference indicates that the user has opted to receive only localized information content having a very high priority level, then the mobile device can present only localized information content indicated as having at least a very high priority level but ignore any localized information content having a lower priority level. The above listing of exemplary filter attributes is for illustration purposes only and is not meant to limit the present teachings in any way. In an implementation, the mobile device can have a default filter preference, which can be set, for example, to present only localized information content having a very high priority level. If the mobile device is not capable of processing the filter attributes, then the mobile device can ignore the filter attributes, and then either present or ignore the localized information content independent of the filter attributes.

Figure 8:
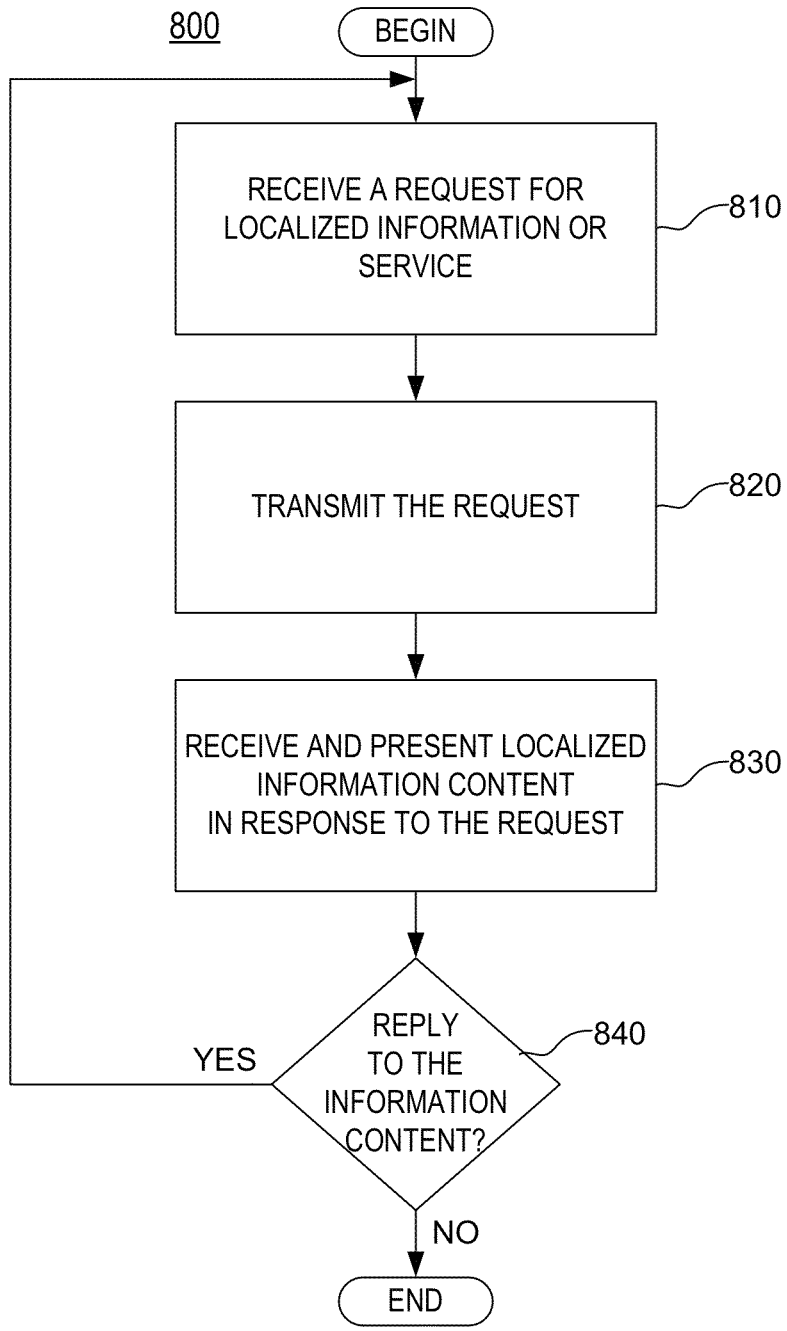
FIG. 8 illustrates a flowchart of processing performed by a mobile device to provide localized information content in response to a localized service or information request, according to implementations of the present teachings.

FIG. 8 illustrates a flowchart of processing 800 performed by a mobile device (e.g., one of mobile devices 130-136 as shown in FIG. 1 or mobile device 200 as shown in FIG. 2) to provide localized information content in response to a request for localized information or service, according to implementations of the present teachings. In 810, the mobile device can initiate processing 800 after receiving a request for localized service or information via a user interface (e.g., user interface 220 as shown in FIG. 2). The localized service or information request can include a type of request, a type of requested service or information, and information associated with the mobile device. The localized service or information request can further include information associated with a subscriber, image and other data contextual to the request, and the like. For example, the mobile device can capture an image or other sensory data via its sensors (e.g., image sensor 250, sensors 290, and the like) and include the image or sensory data with the localized service or information request.

Next, in 820, the mobile device can transmit the request for localized service or information to the wireless communication system. The mobile device can transmit the request via one of the localized components of the wireless communication system. For example, the mobile device can transmit the request via the localized component currently servicing the mobile device, which can be indicated by the mobile device's registration information. In 830, the mobile device can receive localized information content in response to the transmitted request for localized information or service, and can present the localized information content to a user via the mobile device's user interface. Finally, in 840, the mobile device can determine whether or not to provide a reply responsive to the localized information content. For example, the mobile device user can indicate a desire to reply to the person or entity that provided the localized information content. If the determination in 850 is YES, then processing 800 can return to 820 so the mobile device can receive a new request for localized information or service information, which can be associated with the previous request. If the determination in 850 is NO, then processing 800 can be terminated.

When the implementations described herein are implemented in software, firmware, middleware, microcode, and/or program code or code segments, they can be stored in a computer-readable storage medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

The foregoing description is illustrative, and variations in configuration and implementation may occur to persons skilled in the art. For instance, the various illustrative logics, logical blocks, modules, and circuits described in connection with the implementations disclosed herein can be implemented or performed with a general purpose processor, a DSP, an ASIC, an FPGA or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described can be implemented in hardware, software, firmware, or any combination thereof. For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art. If implemented in software, the functions can be stored on or transmitted over as one or more instructions or code on a computer-readable medium. Computer-readable media includes both tangible computer storage media and communication media including any medium that facilitates transfer of a computer program from one place to another. A storage media can be any available tangible media that can be accessed by a computer. By way of example, and not limitation, such tangible computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and blu-ray disc where disks usually reproduce data magnetically, while discs reproduce data optically with lasers. Combinations of the above should also be included within the scope of computer-readable media.

The steps of a method or algorithm described in connection with the implementations disclosed herein can be embodied directly in hardware, in a software module executed by a processor, or in a combination of the two. Although the method has been described by examples, the steps of the method can be performed in a different order than illustrated or simultaneously. A software module can reside in RAM memory, flash memory, ROM, EPROM, EEPROM, registers, a hard disk, a removable disk, a CD-ROM, or any other form of computer-readable storage medium known in the art. An exemplary storage medium is coupled to the processor, such that the processor can read information from, and write information to, the storage medium. In the alternative, the storage medium can be integral to the processor. The processor and the storage medium can reside in an ASIC. The ASIC can reside in a mobile device. In the alternative, the processor and the storage medium can reside as discrete components in a mobile device. Other resources described as singular or integrated can in implementations be plural or distributed, and resources described as multiple or distributed can in implementations be combined. The scope of the present teachings is accordingly intended to be limited only by the following claims.

What is claimed is:

1. A mobile device, comprising:
a wireless interface configured to communicate with a localized component of a wireless communication system, wherein the localized component is associated with at least one geographical region; and
a processor configured to receive localized information content via the wireless interface and present the localized information content, wherein the processor is further configured to:
receive a localized request, the request being localized to the geographical region and comprising information associated with the mobile device, and transmit the localized request to the localized component via the wireless interface;
receive the localized information content responsive to the localized request, the localized information content associated with the geographical region; and
present the localized information content.

2. The mobile device of claim 1, wherein the geographical region is defined by a ZIP code, a state, a county, a municipality, a campus, a street-delimited geographical area, a polygonal geographical area, a circular geographical area, a semi-circular geographical area, a geographical area serviced by a telephone area code, or a wireless communication service area serviced by the localized component.

3. The mobile device of claim 1, wherein the localized component includes at least a cellular site, a cellular tower, a cellular sector, a base transceiver station, or a wireless access point.

4. The mobile device of claim 1, further comprising:
memory configured to store user information, and wherein the processor is further configured to transmit the stored user information with the localized request.

5. The mobile device of claim 1, further comprising:
a sensor for acquiring contextual data associated with the localized request, wherein the localized request comprises the contextual data.

6. A method for performing localized notification, comprising:
wirelessly receiving, by a mobile device in a geographical region, localized information content from a localized component of a wireless communication system, wherein the localized component is associated with the geographical region;

presenting, by the mobile device, the localized information content;

receiving a request by the mobile device, wherein the request is localized to the geographical region;

transmitting the request to the localized component, the request being localized to the geographical region based on the localized component and comprising information associated with the mobile device;

receiving the localized information content responsive to the localized request, wherein the localized information content is generated based on the geographical region; and presenting the localized information content by the mobile device.

7. The method of claim 6, further comprising:

requesting an acknowledgement of receipt of the localized information content from a user of the mobile device;

receiving the acknowledgement from the user; and wirelessly transmitting the acknowledgement.

8. The method of claim 6, further comprising:

acquiring contextual data associated with the localized request, wherein the localized request comprises the contextual data.

9. An apparatus for performing localized notification, comprising:

means for wirelessly receiving, by a mobile device in a geographical region, localized information content from a localized component of a wireless communication system, wherein the localized component is associated with the geographical region;

means for presenting, by the mobile device, the localized information content;

means for receiving a request by the mobile device, wherein the request is localized to the geographical region;

means for transmitting the request to the localized component, the request being localized to the geographical region based on the localized component and comprising information associated with the mobile device;

means for receiving the localized information content responsive to the localized request, wherein the localized information content is generated based on the geographical region; and means for presenting the localized information content by the mobile device.

10. The apparatus of claim 9, further comprising:

means for requesting an acknowledgement of receipt of the localized information content from a user of the mobile device;

means for receiving the acknowledgement from the user; and means for wirelessly transmitting the acknowledgement.

11. The apparatus of claim 9, further comprising:

means for acquiring contextual data associated with the localized request, wherein the localized request comprises the contextual data.

12. A computer program product, comprising:

a non-transitory computer-readable medium storing instructions that causes a mobile device in a geographical region to perform localized notification when executed by the mobile device, comprising:

at least one instruction for causing the mobile device to wirelessly receive localized information content from a localized component of a wireless communication system, wherein the localized component is associated with the geographical region;

at least one instruction for causing the mobile device to present the localized information content;

at least one instruction for causing the mobile device to receive a request by the mobile device, the request being localized to the geographical region;

at least one instruction for causing the mobile device to transmit the request to the localized component, wherein the request is localized to the geographical region based on the localized component, and comprises information associated with the mobile device;

at least one instruction for causing the mobile device to receive the localized information content responsive to the localized request, wherein the localized information content is generated based on the geographical region; and at least one instruction for causing the mobile device to present the localized information content by the mobile device.

13. The computer program product of claim 12, further comprising:

at least one instruction for causing the mobile device to request an acknowledgement of receipt of the localized information content from a user of the mobile device;

at least one instruction for causing the mobile device to receive the acknowledgement from the user; and at least one instruction for causing the mobile device to wirelessly transmit the acknowledgement.

14. The computer program product of claim 12, further comprising:

at least one instruction for causing the mobile device to acquire contextual data associated with the localized request, wherein the localized request comprises the contextual data.

* * * * *